Patented June 10, 1930

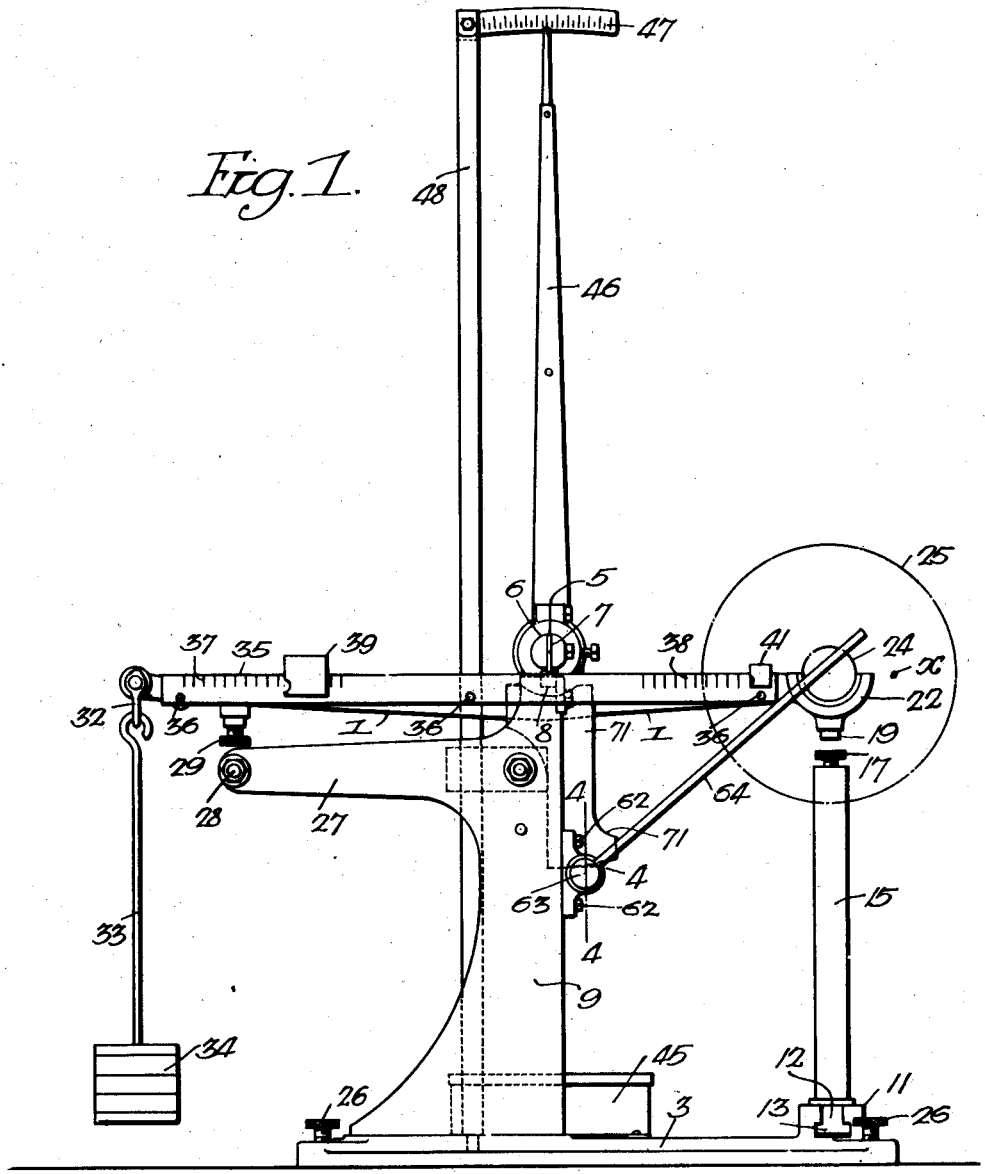

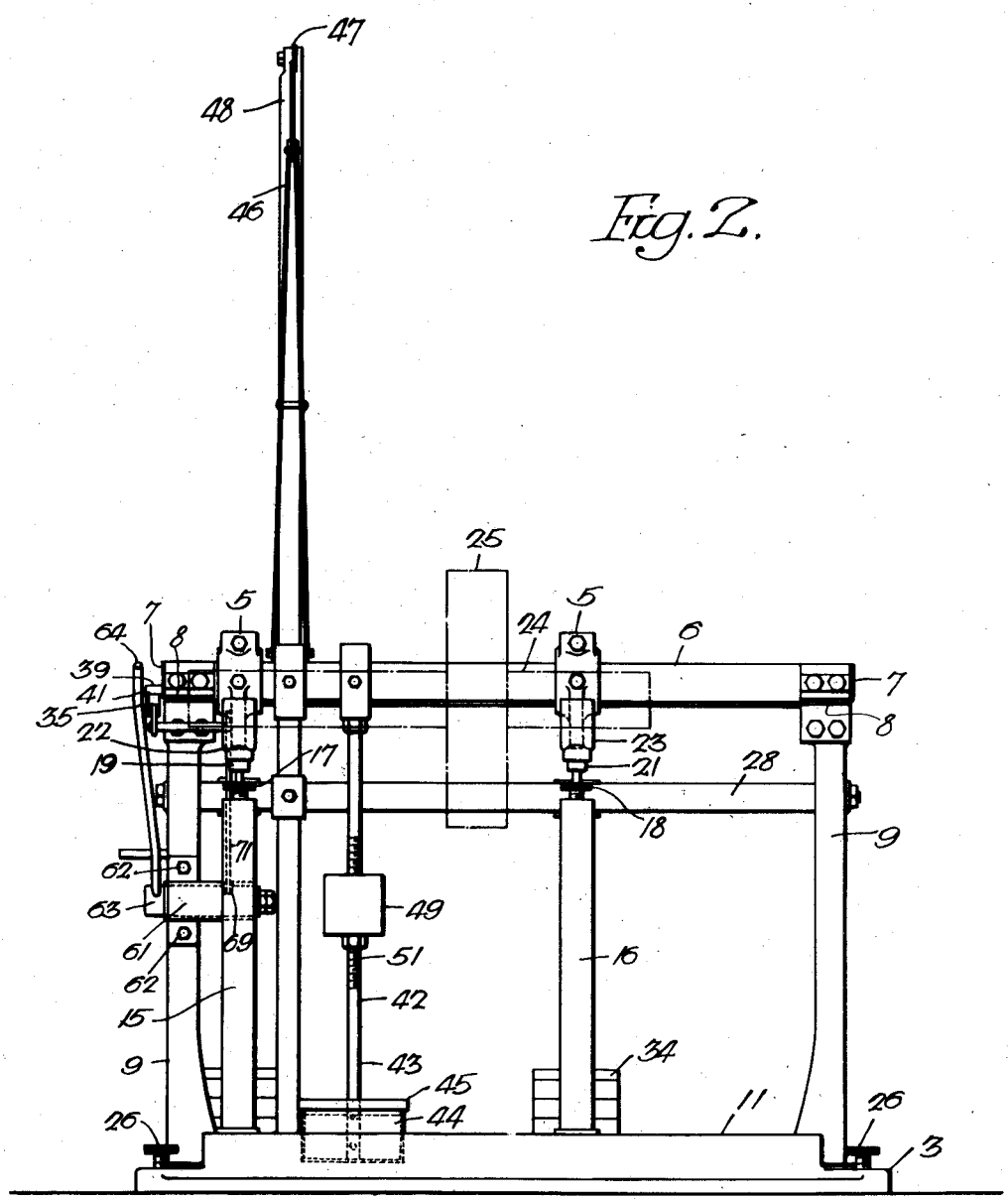

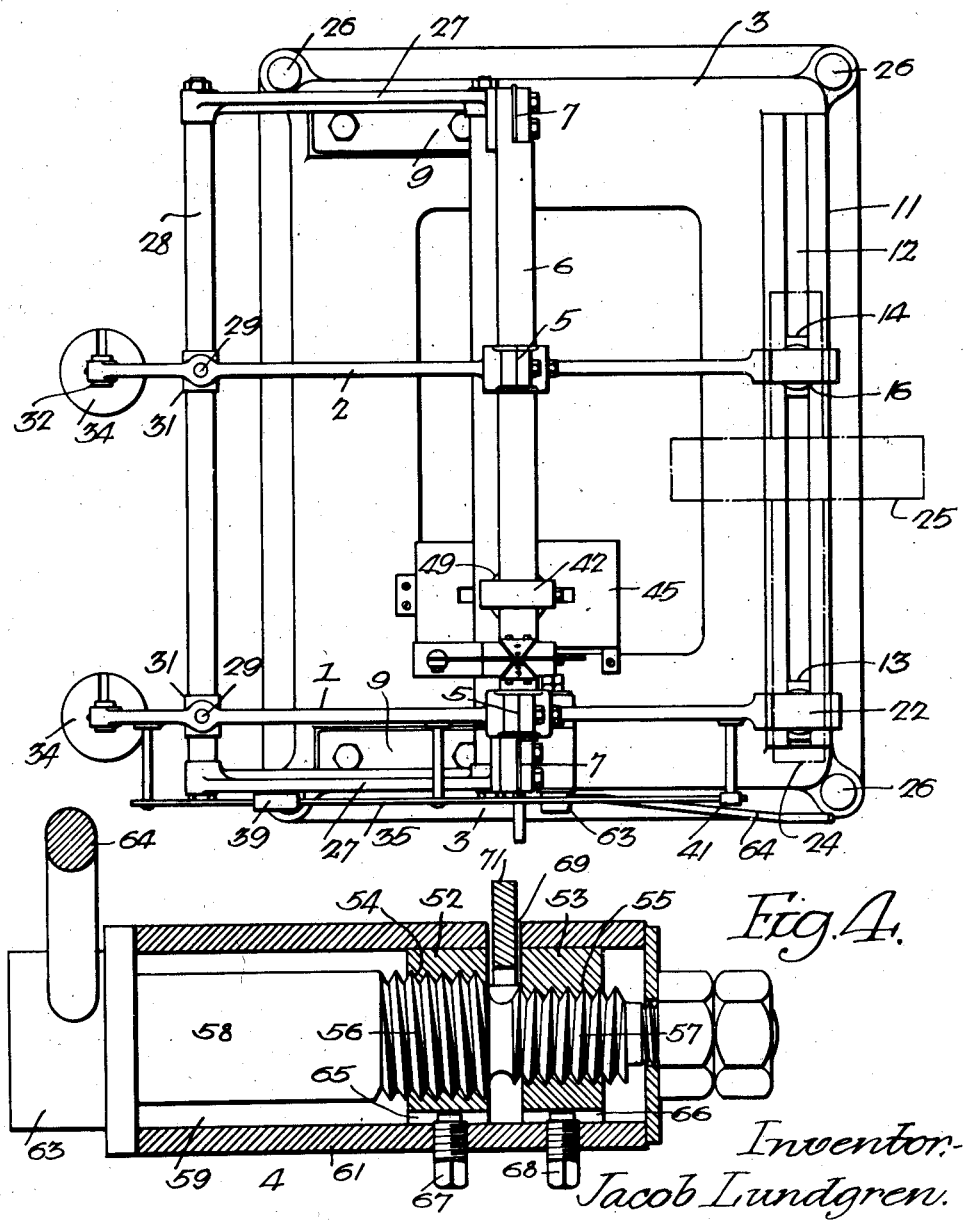

1,763,403

UNITED STATES PATENT OFFICE

JACOB LUNDGREN, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA

BALANCING DEVICE

Application filed November 6, 1924. Serial No. 748,168.

My invention relates to balancing apparatus, and it has for one object the provision of a machine which automatically indicates the amount of unbalance of a body to be tested.

Another object of my invention is to provide a balancing machine, wherein the results are not affected by slight axial or lateral displacements of the specimen.

A further object of my invention is to provide apparatus of the class described which facilitates the determination of the angle within which the balancing weight is to be added.

With these and other objects and applications in mind, my invention further consists in the details of construction and operation and arrangement hereinafter set forth and claimed and illustrated in the accompanying drawings, wherein Fig. 1 is a front elevational view of one form of embodiment of my invention;

Figs. 2 and 3 are side elevational and top-plan views, respectively, of the structure of Fig. 1; and Fig. 4 is a vertical sectional view of the clamping device on the line IV—IV of Fig. 1.

In the illustrated form of embodiment of my invention shown in the drawings, I provide in general a pair of balancing scale beams 1 and 2 which are mounted on a base 3 and adapted to be locked at will by apparatus 4, as will be set forth more fully hereinafter.

The balancing beam 1, of which the beam 2 is substantially a duplication, is adjustably clamped at 5 to a shaft 6, the ends of which are provided with removable fulcrum members 7, 7, fitting in blocks 8, 8 removably mounted on the upper end of spaced pedestals 9, 9, respectively. The latter may be respectively mounted on opposite ends of the base 3 and adjacent to one side thereof. The other side of the base 3 is provided with a longitudinally extending raised portion 11 having a slot 12 for the removable reception of sliding blocks 13 and 14.

The blocks 13 and 14 constitute movable base members for vertically extending stop members 15 and 16, the upper ends of which are adapted to receive adjustable screw members 17 and 18, respectively. The latter are respectively positioned directly beneath shoulders 19 and 21 extending from an under side of bearings 22 and 23 which are formed on corresponding ends of the beams 1 and 2. The bearings 22 and 23 are designed to provide a revoluble mounting for a shaft 24 carrying a body 25 which is to be tested, said body and shaft being shown in dot-and-dash lines. The position of the base 3 may be adjusted by screws 26 mounted on the several corners thereof.

The end pedestals 9, 9 are provided with outwardly extending arms 27, 27, which are interconnected by a bar 28, the latter being disposed directly below the remaining ends of the beams 1 and 2. The sections of the beams 1 and 2 immediately adjacent to the bar 28 are provided with vertically adjustable screw stop-members 29, 29 which respectively co-act with collars or sleeves 31, 31 slidably mounted on the bar 28. The collars 31, 31 serve to prevent the marking of the bar 28 by the stop screws 29, 29. Said remaining ends of the beams 1 and 2 are respectively provided with hinge members 32, 32 adapted to support removable weight holders 33 having one or more weights 34, whereby the specimen 25 and shaft 24 may be substantially counterbalanced.

A scale 35 is secured by bolts 36 to the beam 1 and it is provided with scale portions 37 and 38 and cooperating sliding weights 39 and 41, respectively. The scale portions 37 and 38 are positioned on opposite sides of the shaft or fulcrumed member 6. The accurate balancing of the beams 1 and 2 is further facilitated by giving to one of the sliding weights, say 39, a weight which is a multiple of that of the other sliding weight 41.

My invention contemplates balancing apparatus, wherein the amount of unbalance of the specimens 25 is automatically indicated. To this end, a pendulum 42 is adjustably secured to the fulcrumed member 6 and it may comprise a downwardly extending rod 43 terminating in a blade 44 disposed in an oil-filled receptacle 45, whereby the movement of the pendulum 42 may be suitably dampened. A vertically extending pointer 46, which is adjustably secured to the fulcrumed member 6, is adapted to move over a graduated scale 47. The latter is mounted on a rod 48 rigidly supported on the base 3.

The scale 47 is so graduated that the pointer 46 indicates directly the moments of the pendulum 42 as it is displaced from its vertical position shown in the drawings. In one practical embodiment of my invention, the scale 47 was graduated in ounce-inches and, for purposes of description, it may be assumed that the scale 47 shown in the drawing is so calibrated. The beam scales 37 and 38 are so calibrated that the change in moment incident to a movement of either of the weights 39 and 41 is directly indicated thereon, said change in moment being also indicated by the movement of the pointer 46 over the graduated scale 47.

My invention also embodies means, whereby the scale 47 may be calibrated should it not indicate accurately the change in moment resulting upon a movement of either of the weights 37 and 41. This desired result may be accomplished by mounting a weight 49 on a threaded portion 51 of the rod 43, thereby permitting a vertical adjustment of the weight 49 and a corresponding change in the center of gravity of the pedulum 42.

The clamping or locking apparatus 4 (Fig. 4) comprises a pair of cylindrical collars 52 and 53 having oppositely threaded perforations 54 and 55 for the reception of threaded portions 56 and 57, respectively, of a shaft 58. The shaft 58 is mounted in a boring 59 of a casing 61, the latter being secured by screws 62 to the front end pedestal 9. An outer end 63 of the shaft 58 is provided with an operating handle 64. The cylindrical collars 52 and 53 are caused to move longitudinally of the boring 59, when the cooperating threaded portions 54 and 55 are turned, by providing the lower sides thereof with slots 65 and 66, respectively. The slots 65 and 66 are adapted to receive the ends of screw members 67 and 68 which are adjustably positioned in the walls of the casing 61. An upper side of the casing 61 intermediate the longitudinally movable collars 53 and 54 is provided with a slot 69 for the reception of a plate member 71 extending downwardly from the beam 1.

Thus the beam 1, and hence the several movable parts secured thereto, may be clamped in any desired position by so actuating the handle 64 so as to bring the longitudinally movable collars 52 and 53 into clamping engagement with the opposite sides of the depending plate 71. When it is desired to release the fulcrumed apparatus, the operating arm 64 is actuated in an opposite direction causing the members 52 and 53 to be moved simultaneously out of engagement with the clamping plate 71. The simultaneous movement of the clamping collars 52 and 53 into and out of engagement with the movable plate 71 is necessary in order to avoid any undesirable drag on the movable apparatus.

Assuming the apparatus in the position shown in Fig. 1, wherein the clamping means 4 is disengaged from the movable plate 71 and the center of gravity of the specimen 25, is, say, at $x$ where the moment thereof is greatest, then an angular movement of the specimen 25 through 180°, so as to bring the center of gravity $x$ to the point where the amount thereof is least, causes the pointer 46 to move over the scale 47 a certain number of divisions which represents the amount of unbalance of the specimen 25. Thus the machine embodying my invention indicates automatically the amount of unbalance of a specimen without the necessity of making adjustments to the beam scales and this constitutes one of the important features of my invention.

Having once determined the positions of the specimen 25 giving the maximum and minimum moments, as indicated by the deflection of the pointer 46, the angle within which the balancing weight is to be added may be accurately determined by moving the specimen 25 from either of said positions through an angle of 90°. In this position, a slight movement of the center of gravity $x$ from the exact mid position causes a large change in the moment arm of the body 25 and a corresponding large deflection of the pointer 46. Since the angle within which the balancing weight is to be added may be thus ascertained, and the amount of unbalance of the body 25 is already determined, the body 25 may now be balanced with a high degree of accuracy.

As may be readily seen, the clamping apparatus 4 is particularly important during the determination of the several positions above-noted, since the movements of the pointer 46 may be quickly damped. When the apparatus is out of use, the clamping apparatus 4 is actuated into its effective position, wherein the scale beams 1 and 2 are positively locked in position.

While I have shown only one form of embodiment of my invention, for the purpose of describing the same and illustrating its principles of construction and operation, it is apparent that various changes and modifications may be made therein without departing from the spirit of my invention, and I desire, therefore, that only such limitations shall be imposed thereon, as are indicated in the appended claims or as are demanded by the prior art.

I claim:

1. Apparatus comprising a pendulum, a pair of fulcrumed members movable therewith and providing specimen supports a predetermined distance from the fulcrums, the fulcrums and the specimen supports being in a common plane, and indicating means responsive to a movement of said pendulum.

2. Apparatus for measuring the unbalance of a body comprising a pair of fulcrumed beams providing a specimen support a certain distance from the fulcrum, and means constituting an adjustable pendulum movable therewith.

3. Apparatus comprising members having fulcrums, said members having specimen supports in the plane of said fulcrums and spaced therefrom, indicating means responsive to a movement of said members, and means including a pendulum for adjusting the calibration of said indicating means.

4. In combination, a pair of beams having fulcrums, said beam being adapted to provide for substantially all specimens a support having a constant spaced relation to said fulcrums, and means whereby the unbalance of said body may be automatically indicated as it is moved from one angular position to another.

5. Apparatus comprising a pendulum, a beam secured thereto and comprising arms disposed on opposite sides thereof, one of said arms affording a mounting for a body to be tested, counterbalancing means secured to the other of said arms, and means for automatically indicating the moments of said body for different angular positions.

6. In a balancing device, the combination with a beam adapted to support a specimen and a balancing weight, of a pendulum so secured to said beam as to balance the moments of said body for different angular positions, said pendulum including means for calibrating said indicating means.

7. Apparatus comprising a beam affording a mounting on one end for a body to be tested, counterbalancing means mounted on the other end, and means for directly indicating the amount of unbalance of said body as the moments thereof are changed from a maximum to minimum value, said means comprising a pendulum, a pointer and a cooperating scale, the latter being calibrated to indicate directly the moments of said pendulum for different positions.

8. Balancing apparatus comprising a beam having a fulcrum and a specimen-supporting means disposed in a common plane, a pendulum so secured to said beam as to tend to maintain the same in a certain position, an indicating element operatively associated with said pendulum, and means for clamping said beam in a desired position.

9. In combination, a pivoted beam, means for exerting a pendulum effect on said beam, means for increasing the damping effect of said pendulum means on said beam, a pointer responsive to a movement of said beam, and means for damping at will the movement of said beam.

10. Apparatus comprising a pair of pivoted beams adapted to support a body to be balanced, a pendulum operatively associated with said beams so as to be movable into different angular positions as the moment of said body is varied, and means responsive to the angular movement of said pendulum for automatically indicating the amount of unbalance of said body.

11. Balancing apparatus comprising a beam, a pendulum operatively secured to said beam, a plate member extending from said beam, a threaded member, and a pair of clamping blocks constituting nuts for said member, said blocks being simultaneously movable into and out of engagement with the sides of said plate.

12. Weighing apparatus comprising a pair of standards providing a mounting for a fulcrumed member, and a pair of beams secured to said member, said standards having portions interconnected by a bar, the latter being so disposed as to constitute a stop for said beams when moved in one direction.

13. Apparatus comprising a pair of standards providing a mounting for a fulcrumed member, a pair of beams secured to said member, said standards having projecting portions interconnected by a bar, the latter being so disposed as to constitute a stop for said beams when moved in one direction, and standards spaced to constitute stops for said beams when moved in an opposite direction.

14. Balancing apparatus comprising a base having spaced pedestals for supporting a fulcrumed member, beams operatively associated with said member, a pair of arms extending respectively from said pedestals and so interconnected by a member as to form stops for corresponding ends of said beams, a second pair of stops for the remaining ends of said beams, and a pendulum operatively associated with said fulcrumed member.

15. Balancing apparatus comprising a base having spaced pedestals for supporting a fulcrumed member, beams operatively associated with said member, a pair of arms extending respectively from said pedestals and so interconnected by a member as to form stops for corresponding ends of said beams, a second pair of stops for the remaining ends of said beams, and a pointer and a pendulum operatively associated with said fulcrumed member.

16. Balancing apparatus comprising a base having spaced pedestals for supporting a fulcrumed member, beams, a pair of arms extending respectively from said pedestals and so interconnected by a member as to form stops for corresponding ends of said beams, a second pair of stops for the remaining ends of said beams, a pointer operatively associated with said fulcrumed member, a cooperating scale, and a pendulum the center of gravity of which may be adjusted.

17. Apparatus comprising a shaft, a pair of beams mounted on said shaft so that the relative spacing between said beams may be adjusted, an indicating element secured to said shaft, and means for lowering the center of gravity of the parts below said shaft.

18. Apparatus comprising a shaft, a beam mounted on said shaft for axial adjustment, and means for exerting a pendulum effect on said beam.

19. Balancing apparatus comprising a shaft, an axially adjustable beam mounted on said shaft, an indicating element adjustably secured to said shaft, and a pendulum extending from said shaft.

20. Apparatus comprising a pair of standards, a supporting element mounted on said standards, a member adapted to serve as a beam mounted on said element, and a member so mounted between said standards as to constitute a stop for said first mentioned member, one of said members having an adjustable abutment in cooperative relation to the other member.

21. Apparatus comprising a pair of standards, a member fulcrumed on said standards, a pair of beams secured to said member and adapted to support a specimen on corresponding ends thereof, and standards respectively disposed adjacent to said beam ends so as to constitute stops for the same.

22. Apparatus comprising a pair of standards, an element movably mounted on said standards, a member constituting a beam secured to said element and adapted to support on one end thereof a specimen to be tested, a second member constituting a standard positioned in operative relation to said beam end, and an adjustable abutment on one of said members in operative relation to the other.

23. Balancing apparatus comprising a pair of standards, an element fulcrumed on said standards, a pair of beams mounted on said element, and a pair of standards spaced to constitute stops for said beams, at least one of said stops being adjustable longitudinally of said element.

24. Balancing apparatus comprising a fulcrumed member, a pair of standards for supporting the same, a bar extending between said standards provided with a protective sleeve, and a beam so mounted on said member as to engage said sleeve when moved in one direction.

25. Balancing apparatus comprising a fulcrumed member, a pair of standards for supporting the same, a bar extending between said standards provided with a protective sleeve, and a beam so mounted on said member as to engage said sleeve when moved in one direction, said beam having an adjustable abutment.

26. Balancing apparatus comprising a base having spaced pedestals, a supporting element mounted thereon, a pair of beams mounted on said element, and a pair of adjustable stops for corresponding ends of said beams, said stops being so mounted on said base as to be movable axially of said element.

JACOB LUNDGREN.